United States Patent [19]

van der Meulen

[11] 4,455,652

[45] Jun. 19, 1984

[54] APPLIANCE COMPRISING A DIGITAL PROGRAMMING DEVICE WHICH IS PROTECTED AGAINST MALFUNCTIONING DUE TO UNCONTROLLED SWITCH-ON PHENOMENA

[75] Inventor: Andries van der Meulen, Beetsterzwaag, Netherlands

[73] Assignee: U.S. Philips Corporation, New York, N.Y.

[21] Appl. No.: 275,464

[22] Filed: Jun. 19, 1981

[30] Foreign Application Priority Data

Jun. 20, 1980 [NL] Netherlands ............... 8003567

[51] Int. Cl.³ .......................................... G06F 11/00
[52] U.S. Cl. .................................. 371/16; 364/184; 364/186
[58] Field of Search ............. 364/184, 186, 130, 900; 371/16, 20

[56] References Cited

U.S. PATENT DOCUMENTS

4,063,311 12/1977 Jeremiah et al. ............ 364/184 X
4,122,996 10/1978 Wilczek ....................... 371/20
4,223,379 9/1980 Simcoe ........................ 364/184 X Primary Examiner—Gareth D. Shaw
Assistant Examiner—Ronni S. Malamud
Attorney, Agent, or Firm—Thomas A. Briody; Jack E. Haken; James J. Cannon, Jr.

[57] ABSTRACT

An appliance including a digital programming device for forming a sequence of control signals. When the device is switched on by way of the power supply plug, an unpredictable switch-on phenomenon occurs and the program memory is liable to be addressed in a variety of locations. Therefore, during a preparation routine the start conditions are realized. Furthermore, a multi-bit code is generated and stored in a volatile section of the memory. The operative routine comprises a sub-routine which tests this code. If the code is not correct, the preparation routine has not been followed when the appliance was switched-on. The operative routine is then interrupted and first the preparation routine is executed. All further locations in the non-volatile memory section preferably refer to the preparation routine.

5 Claims, 8 Drawing Figures

|  | X0 | | | | X1 | | | | X2 | | | | X3 | | | |
|---|---|---|---|---|---|---|---|---|---|---|---|---|---|---|---|---|
| Y0 | | | | | P | P | P | P | 0 | 1 | 1 | 0 | 0 | 0 | 0 | 0 |
| Y1 | | | | | | | | | 0 | 1 | 1 | 1 | 0 | 0 | 0 | 0 |
| Y2 | | | | | | | | | 1 | 0 | 0 | 0 | 0 | 0 | 0 | 0 |
| Y3 | | | | | | | | | 1 | 0 | 0 | 1 | 0 | 0 | 0 | 0 |
| Y4 | | | | | | | | | 1 | 0 | 1 | 0 | 0 | 0 | 0 | 0 |
| Y5 | | | | | | | | | 1 | 0 | 1 | 1 | 0 | 0 | 0 | 0 |
| Y6 | | | | | | | | | 1 | 1 | 0 | 0 | 0 | 0 | 0 | 0 |
| Y7 | | | | | | | | | 1 | 1 | 0 | 1 | 0 | 0 | 0 | 0 |
| Y8 | | | | | | | | | 1 | 1 | 1 | 0 | 0 | 0 | 0 | 0 |
| Y9 | | | | | | | | | 1 | 1 | 1 | 1 | 0 | 0 | 0 | 0 |
| Y10 | | | | | | | | | 0 | 0 | 0 | 0 | 0 | 0 | 0 | 0 |
| Y11 | | | | | | | | | 0 | 0 | 0 | 1 | 0 | 0 | 0 | 0 |
| Y12 | | | | | | | | | 0 | 0 | 1 | 0 | 0 | 0 | 0 | 0 |
| Y13 | | | | | | | | | 0 | 0 | 1 | 1 | 0 | 0 | 0 | 0 |
| Y14 | | | | | | | | | 0 | 1 | 0 | 0 | 0 | 0 | 0 | 0 |
| Y15 | | | | | | | | | 0 | 1 | 0 | 1 | 0 | 0 | 0 | 0 |

FIG.8

APPLIANCE COMPRISING A DIGITAL PROGRAMMING DEVICE WHICH IS PROTECTED AGAINST MALFUNCTIONING DUE TO UNCONTROLLED SWITCH-ON PHENOMENA

BACKGROUND OF THE INVENTION

1. Field of the Invention

The invention relates to a stand-alone appliance for general consumer use, which includes a control circuit which having a first input for receiving a first supply current, a second input for receiving a specific control signal, and a first output for a controlled activation signal; a functional member which comprises a second input for receiving said activation signal; a digital programming device which comprises a non-volatile memory section which contains a control program for said functional member in first memory locations, and which also comprises a volatile memory section for variable data, a third input for receiving a second supply current directly from a distribution member, a fourth input for a specification signal for said functional member, and a second output for said specific control signal; and externally activatable means for forming said specification signal.

2. Description of the Prior Art

There is a strong rise in the numbers of such appliances in use already. An appliance is to be understood to mean herein a so-called "consumer product" which does not require special skills for use; the appliance can be subdivided into two parts as if it were: the functional member which performs the actual consumer function, and the control which determines how this consumer function is realized.

Examples of such appliances are:

textile washing machines with various washing programs (the selection is determined by selective adjustment and/or measuring signals from sensors of given parameters, for example, in dependence of the nature and the quantity of laundry);

dish washers and electrical/electronic ovens, for which similar situations apply;

television receivers with built-in generators for games, preselection devices for given stations, for adjustment facilities, and the like;

vacuum cleaners whose cleaning power is determined in dependence of one or more parameters measured;

irradiation devices ("sun lamps") for domestic use with an adjustable irradiation time.

The embodiment described hereinafter is the best embodiment considered by the inventor; this irradiation device has already been described in part in the previous Netherlands patent application No. 7812150 and the corresponding U.S. Pat. No. 4,303,67 in the name of the assignee of this application and which are hereby incorporated by reference.

A large sub-category is thus formed by domestic appliances. The term "stand-alone" is to be understood to mean herein that the appliance can operate independently without being subordinate to an external device. In other words, it does not operate like a peripheral apparatus which is subordinate to a central computer.

Devices of this kind can in principle be switched on in two ways. The first way is by means of an on/off or reset switch or the like, so that the program is started under standard conditions. This is also the way used for professional equipment, for example, a digital computer and its peripheral apparatus (terminals). The second way of putting into operation is by applying the operating voltage to the device by insertion (or a similar operation) of the contact member into a contact position (for example, a wall socket) of the power source. The latter will often be done particularly in the case of devices which can be readily transported, because they can be stored after use. Such appliances often do not include such a costly reset switch. The second way of putting into operation produces a very unpredictable, prolonged and jittery switch-on phenomena on the supply voltage. For correct execution of the program the programming device should start at a predetermined address. As will be described in detail hereinafter, a microprocessor of the types TMS 1000 is used as the programming device in the embodiment in accordance with the invention. The starting address can then be generated, subject to special conditions, that is to say if either the supply voltage reaches a sufficiently high level within 3 milliseconds and does not decrease again (this requirement is often not satisfied), or if a specific voltage pulse is generated on an appropriate initiating input. Similar requirements are applicable to other programming devices. Such a programming device generally comprises a memory section which contains the (fixed) program. There is also storage space for variable data, such as one or more addresses for the program memory, intermediate results, parameter signals and the like. These variable data are lost if the supply voltage is interrupted.

A special problem with many of the above domestic appliances is that they influence a physical parameter value, such as a motor speed or a temperature. If an arbitrary data of the memory with volatile content can occur, said influencing is liable to take place in an incorrect manner and/or at the incorrect instant (for example, the washing machine starts to run directly upon inserting the power plug, or the irradiation lamp is set to complete an impermissible irradiation time).

SUMMARY OF THE INVENTION

It is an object of the invention to realize automatic generating of the starting address, regardless of the fact that initially an arbitrary memory address is liable to be reached due to severe and prolonged interference signals on the second supply current, so that no operational condition as regards the influencing of said parameter values can be reached, it being impossible to abandon said condition, or to abandon it only by taking special steps, or only after an excessive period of time. The object in accordance with the invention is realized in that said programming device comprises:

first circuit for implementing an operative routine for generating said specific control signal, each persistent loop thereof comprising a subroutine which tests a dummy multi-bit code which is stored in a predetermined location of said volatile memory section;

second circuit for implementing a preparation routine which has a beginning and an end, the latter being connected to a beginning of the operative routine, and which first unconditionally generates said multi-bit code and subsequently a starting condition for the operative routine, the beginning of the preparation routine being indicated by the programming device under the control of a negative result of said test. A persistent loop will generally be a loop which cannot at all be abandoned without a given external step being taken. In given cases loops which are traversed for a finite period of time will also be provided with a subroutine for the testing. For example, in many operating conditions a staying time of one half second will not be considered to be detrimental by the user. However, if this is a condition with an activated radiation source, such an interval will be too long.

Preferably, said operative routine comprises only one persistent loop in which said subroutine is contained. This results in a simple composition of the program, and the preparation routine requires little storage space.

Said multi-bit code may contain a series of multi-bit elements, there being provided a pointer for indicating, upon passage of said subroutine, exclusively one next multi-bit element of said series for testing. On the one hand, an extended code can thus be used; this offers the advantage that it is very unlikely that the code is "accidentally" formed upon switching on: a four-bit code, for example, will usually offer insufficient protection. If one of the multi-bit elements of such a series "accidentally" assumes the correct value during switching on, another multi-bit element of the series will be tested when the relevant loop is traversed again. For each time that the loop is traversed, however, only a small part of the code is tested, so little time is required. Thus, a continual but simple test is performed during operation as regards mulfunctions (for example, power failures) which could impermissibly affect the content of the volatile memory section. The elements of the series may have a variety of values. Preferably, they do not all have the same value, and preferably not all bits of a multi-bit code element have the same value. However, this preference need not be satisfied for all code elements. For example, a simple series may be: 010101, 101010.

A number of further memory locations of said non-volatile section may also contain pointer information indicating said beginning of the preparation routine. The reliability is thus further enhanced. A program is understood to mean herein: the assembly of permanently stored information for controlling the cooperation between programming device and functional member, so including any test and measuring functions. If the functional member can complete several "programs", such as "washing programs" in a textile washing machine, these programs all belong to the described machine program. If the programming device enters a state outside the program when the appliance is put into operation, the beginning of the program is quickly reached, i.e. as soon as such pointer information is encountered during the traversing of the non-volatile section of the memory. If the program memory is divided into pages, pointer information will be provided at least at the end of each page or at the end of a part of a page which is not further used.

Preferably, each separately addressable location of said non-volatile section contains either a word of said program or pointer information indicating said beginning of the preparation routine. Thus, said beginning is reached faster, because sequential addressing of several address locations of said non-volatile memory section is no longer necessary.

The described steps can be implemented in various ways. If the capacity of the volatile memory section is insufficient to accommodate the multi-bit code, it has to be expanded. The memory already present suffices in other cases. However, an appliance will always be obtained which commences with the preparation routine directly or substantially directly, even if the putting into operation of the appliance were to take place in an extremely uncontrolled manner.

BRIEF DESCRIPTION OF THE FIGURES

The invention will be described in detail with reference to some Figures.

DESCRIPTION OF THE PREFERRED EMBODIMENT

Figure 1:
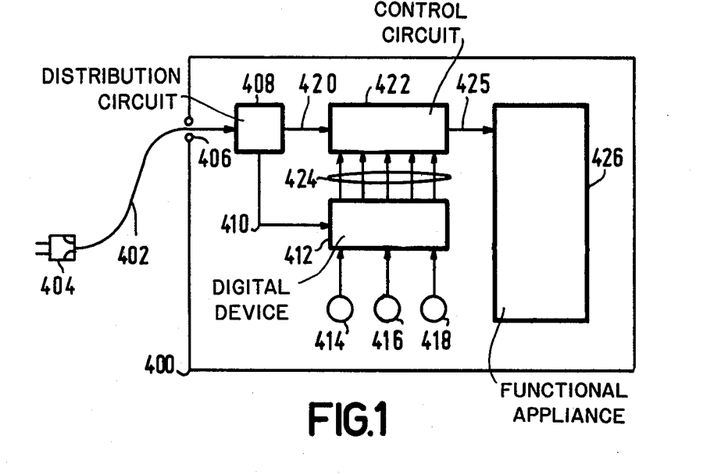
FIG. 1 shows a circuit diagram of an appliance.

FIG. 1 shows a block diagram of an appliance comprising a programming device. The assembly is accommodated in a cabinet 400 and can be connected to the public electricity supply by way of a power cable 402 and a power plug 404. Via a grommet 406, the cable 402 is connected to a distribution circuit (distribution member) 408; this circuit comprises, for example, a fuse, voltage converters, a power switch and the like. The grounding of the assembly has not been shown for the sake of brevity. A digital device 412 is powered via a (possibly multiple) line 410. The latter receives specification signals from the knobs 414, 416, 418. These signals concern, for example, the duration and the starting instant of the irradiation. In another application, these specification signals may also be one or more parameter signals; in that case the elements 414, 416, 418 may also be sensors which indicate, for example, the water temperature and/or the degree of filling in the case of a washing machine; these sensors may then be connected to the functional member 426. Via a line 420, a control circuit 422 also receives a supply current. The control circuit also receives a specific control signal via a line 424 which is shown to be multiple. In a simple case, the line 424 is a single line and the specific control signal concerns only the two possibilities "on" and "off". It is alternatively possible for this control signal to have a single analog value which indicates, for example, a number of revolutions per time unit. In the present embodiment, the control signal concerns an "on/off" signal as well as a number of control signals for the display of an irradiation time. In the case of a washing machine, these control signals can test the various subfunctions of the washing process, such as the actuation of the motor, the activation of the heating coil, and also various valves and taps. Thus, in a simple case the control circuit 422 comprises one or more electromechanical or electronic switches. However, it may also comprise analog members, for example, for controlling a current intensity.

The controlled activation signals appear on a line 425; this line may also be of a multiple type. These signals may be supply signals (for example, 220 V, 50 Hz), or pulse signals. An element 426 in this case represents the function, so the radiation lamp (lamps) and the display elements for the exposure time in the present embodiment. All functions shown within the block 426 are known per se.

Figure 2:
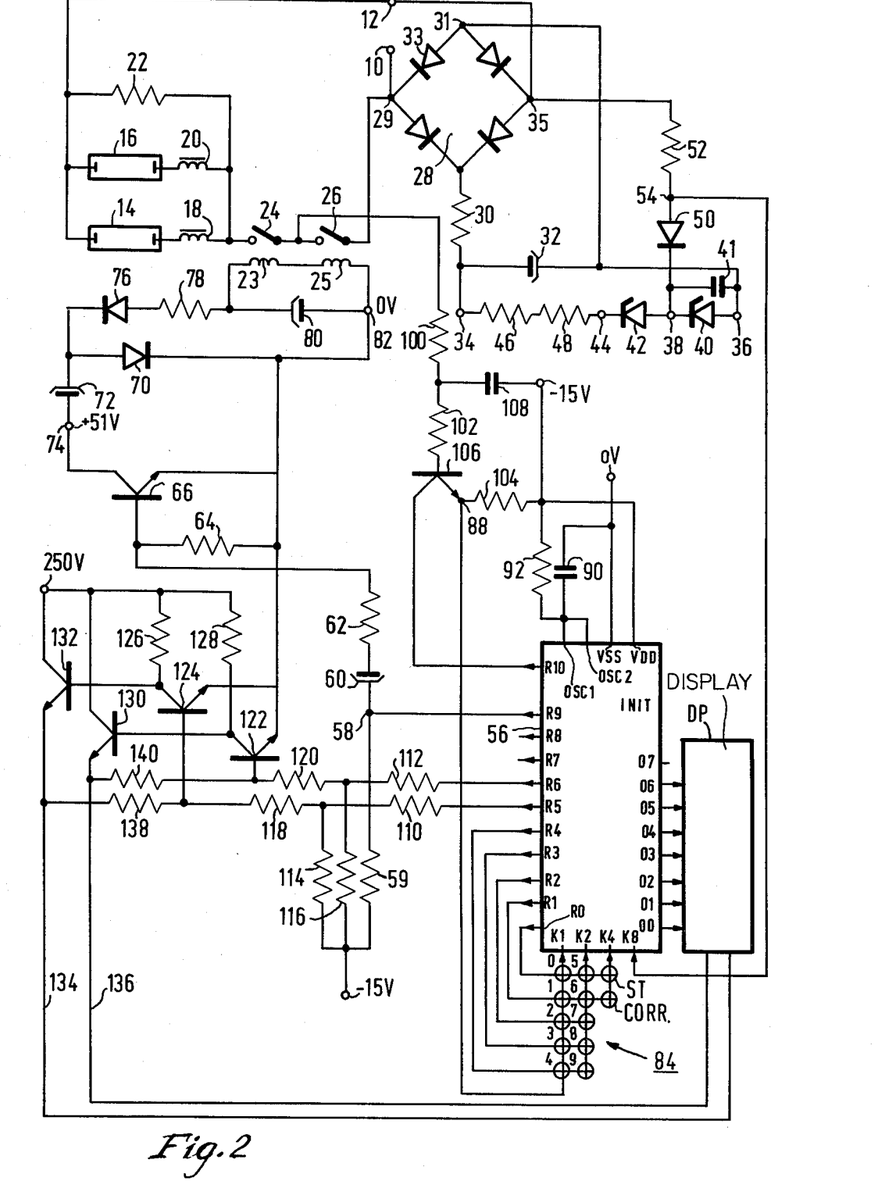
FIG. 2 shows a detailed program of an irradiation device.

FIG. 2 shows a detailed diagram of an irradiation device, including a control circuit and programming device. In the connected condition, the terminal 10, 12 carry the supply voltage, for example, 220 Volts, 50 Hz. The circuit is "double isolated", but the relevant means are not shown. Therefore, this means that the control elements in the remainder of the circuit "float" with respect to ground. Furthermore, there are provided two parallel connected a.c. irradiation lamps 14, 16 of a known type, a smoothing coil 18, 20 being connected in series with each lamp. A parallel resistor 22 of 220 kohms is provided to check the switches (whether they are in the correct position "open/closed"). Further components have been omitted for the sake of simplicity. The two lamps are activated when both series-connected switches 24, 26 of the type LCICE, 24 V, make OMRON, are in the closed condition. The circuit furthermore comprises a generator for direct voltages. The arrangement 28 is full-wave rectifier comprising four diodes of the type BY 179. Smoothing is obtained by means of a resistor 30 (560 Ohms) and the capacitor 32 (2.5 microfarads). A voltage difference of approximately 265 volts then exists between the terminals 34 and 36. A Zener diode 40 of the type BZX 79 C 15 produces a voltage difference of 15 volts between the terminals 36 and 38. A Zener diode 42 of the type BZW 87 C 51 produces a voltage difference of 51 volts between the terminals 38 and 44. Resistors 46 and 48 each have a value of 4700 ohms. Via diode 50 of the type BZW 62 and resistor 52 of 150 kohms, the terminal 38 is connected to the terminal 12, thus defining a level of approximately 0 volts. Hereinafter, this level is logic "1". The voltage level of terminal 36 is thus approximately −15 volts, which is logic "0" hereinafter. The terminals 35, 36, 38, 44 are connected to further components of the circuit by way of connections not shown. The junction of the diode 50 and the resistor 52 is connected to input K8 of the programming unit 56. The programming unit 56 is a microprocessor of the type TMS 1000 (Texas Instruments). This microprocessor comprises inter alia a logic arrangement (PLA) which can be used for activation of a digital display device, further connections for interrogation and reading of a (simple) keyboard, and a number of control connections for the execution of further functions. First, the activation of the switches 24, 26 will be described. Terminal 74 is connected to the voltage of +51 volts (terminal 44). In the rest condition, transistor 66 (BC 639) is blocked, so that substantially the entire voltage of +51 volts is present across the capacitor 72 (47 microfarads). Terminal 82 carries a potential of 0 volts (terminal 38) and the coils 23, 25 are not excited. Via resistor 65 (2200 ohms), the base electrode of the transistor 66 is connected to 0 volts. During the on-time (see hereinafter), the microprocessor 56 continuously supplies pulse-like signals having a width of 1 millisecond and a frequency of 50 Hz. These signals appear on output R9 and are applied, via coupling capacitor 69 (2.2 microfarads) and resistor 62 (5600 ohms) to the base electrode of the transistor 66. Via resistor 59 (10 kohms), line 58 is also connected to a potential of −15 volts. Under the control of the above pulse-like signal, transistor 66 becomes conductive and capacitor 72 is discharged. In this situation, diode 76 (type BAW 62) becomes conductive, so that via resistor 78 (39 ohms) the capacitor 80 (capacitance 22 microfarads) is charged, the charge being derived from the capacitor 72. After termination of the pulse on line 58, the transistor 66 is blocked and the capacitor 72 is recharged. The upper electrode (on the side of the diode 76) of the capacitor 72 cannot receive a positive charge as a result of the presence of the diode (type BAW 62). The diode 76 is also blocked after termination of the pulse on line 58. The charge on the capacitor 80 is depleted via the coils 23, 25 which have a RC-time constant amounting to several tens of milliseconds. Moreover, the switches 24, 26 open only after the voltage across the coils has decreased to a low value (4 volts) with respect to the nominal voltage. Thus, it would allowable that an appreciable number of pulses on line 58 (in the order of ten directly successive pulses) could be absent. Only if still more pulses fail to arrive, the switches 24, 26 are opened. Such a pulse may be lacking because an operations cycle in the programming unit 56 is not completed correctly. As will be described hereinafter, such completion acts for updating the on-time yet to be completed. Therefore if such updating is not effected correctly, the pulses are lacking and there upon the irradiation will be terminated quickly through the opening of the switches. Hereinafter, the circuit will be described with reference to the keyboard. The keyboard 84 comprises ten digit keys 0-9 for keying in on-time information, one key ST for keying in a start signal, and one key CORR for invalidating an incorrectly operated key. It is also assumed that at the most one key is depressed at any time. In a given phase of the program of the device 56 (see hereinafter), the output terminals R0-R4 are successively activated by an interrogation signal. For example, if key 7 is depressed and terminal R2 is activated, it is coupled to input terminal K2. In that case activation of the terminals R0, R1, R3, R4 does not result in further coupling. A depressed key becomes known to the microprocessor by way of decoding. Terminal K1 also receives a signal from point 88, and terminal K8 from the correction key CORR. The further control and powering of the microprocessor are realized as follows. Terminals OSC1 and OSC2 are interconnected. Terminal VSS is connected to a voltage level of 0 volts (substrate). VDD is connected to a voltage level of −15 volts (supply voltage). Between the terminals OSC1/2 on the one side and the terminal VSS on the other side there are connected a capacitor 90 of 47 picofarads and a resistor 92 of 47 kohms. These two components define the clock pulse cycle of the microprocessor to a value of approximately 300 kHz as stated by the manufacturer. Hereinafter the circuit for detecting whether one of the switches 24, 26 is in the closed condition, i.e. outside the on-time of the discharge tubes 14, 16, will be described. The means used for this purpose are: the resistors 100, 102 (330 kohms), 104 (39 kohms), the transistor 106 of the type BC 546 and the capacitor 108 (0.22 microfarads). Assume that the switch 24 is open and that the switch 26 is closed. The potential of point 29 is then decisive; on average this potential is higher than that of point 31. The potential of point 20 may never be lower than the potential of point 31 by more than the voltage drop over conducting diode 33 (approximately one volt). On the other hand, at any given instant it may be higher than the potential of point 31, depending on the phase of the a.c. supply voltage. As a result, capacitor 108 is charged with an RC-time of approximately 0.07 s. When terminal R10 of the microprocessor 56 is activated by a signal "1" (approximately 0 volts), transistor 106 becomes conductive, so that the potential of point 88 also becomes logic "1". The latter signal is detected on terminal K1 of the microprocessor 56. If both switches (24, 26) are open in the foregoing case, the signal on point 88, however, is approximately −15 volts, via resistor 104; this always signals a logic "0". In this respect it is to be noted that the tolerances with respect to the value −15 volts are rather broad: a difference of a few volts still results in the logic value "0". With respect to the value 0 volts, the deviation may only be a few tenths of a volt. The evaluation of the intermediate range (for example, between $-\frac{1}{2}$ and −10 volts) will not always be the same. On the other hand, if the switch 24 is closed and the switch 26 is open, the potential of the point 35 is decisive. Via a similar diode, this point is connected to point 31 so that it has a potential which is higher than that of the terminal 36. The foregoing is again applicable to the state of the transistor 106: the terminal K1 again receives a logic "1". If both switches 24 and 26 are closed, inter alia the irradiation tube is activated. If both switches become defective during the on-time so that they can not be interrupted, the protection has failed. The risk of such a double failure is very small and may be neglected. The display circuit will now be described. For this purpose, the microprocessor comprises two selection outputs R5 and R6. Also provided are seven code signal outputs 00–06 which are controlled, by way of an internal logic arrangement (PLA), for activation of a seven-segment display device. For the sake of brevity, this device is represented as a block DP. The selection outputs R5, R6 are connected, via resistors 110, 112 (27 kohms) and 114, 116, 118, 120 (all 33 kohms), to a potential of −15 volts and the base electrodes of transistors 122, 124 (type BF 422), respectively. The emitter electrodes thereof are connected to point 82 (potential 0 volts). The collector electrodes thereof are connected, via resistors 126, 128, (value 33 kohms), to a power supply potential of 250 volts (terminal 34). The latter is suitable for activation of the actual display elements. If terminals R5, R6, carry a high potential, transistors 122, 124 are conducting; their conductor electrodes thus being at a low potential. As a result, the transistors 130, 132 are cut of and the lines 134, 136 are maintained at a low potential via resistors 138, 140 (value 681 kohms). Display elements are then in the nonselected condition. If the transistors 122, 124 are blocked by a low signal on the terminals R5, R6, the high potential of their collector electrodes insures that the corresponding transistor 130 or 132 (BF 422) becomes conductive, and the relevant lead 134, 136 is controlled to a high potential. The display power is applied to the display elements via these leads.

Figure 3:
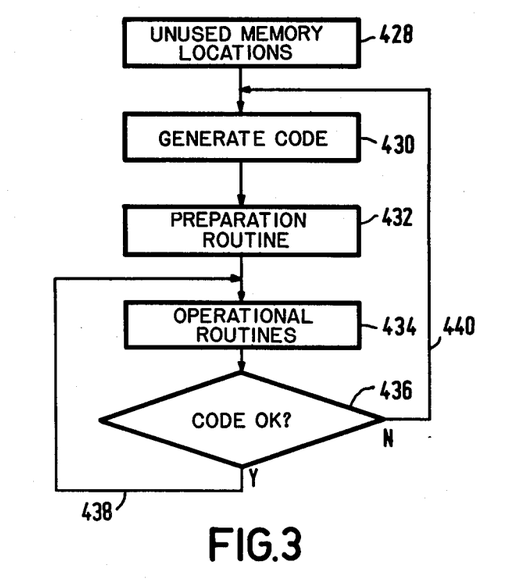
FIG. 3 shows an elementary flow chart.

FIG. 3 shows an elementary flow chart of the organization of this embodiment of the device. This flow chart comprises first of all a block 432: the preparation routine whose specific subfunctions will be described hereinafter. Block 434 contains the other or "operative" routines which will also be described hereinafter. The latter consist of a large number of different subroutines which are repeatedly completed in that the program has a loop structure. The embodiment comprises only one such loop, the traversing continuing for as long as the power supply voltage is present. A further embodiment could comprise two different loops: one loop which is continuously traversed when the radiation sources are "on", and a second loop which is continuously traversed when the radiation sources are "off". The set of operative routines is symbolized herein as a single block 434. In each persistent loop in the set of operative routines and, for example, at the end of such a loop it is tested whether a part yet to be specified of the read/write memory of the microprocessor contains a predetermined 16-word code. This test is symbolized by the square 436: code O.K.? If the answer is "yes" (Y), the program may proceed to a next operative routine via line 438. This will be the case after correct initiating. It may be that the irradiation has then been terminated or that it has not yet started: so-called "waiting" routines are then in progress. As will be described hereinafter, such waiting routines are also included in the same loop. On the other hand, the execution of the program can be terminated by setting the power switch to the "off" position or by pulling the plug (404) out of the socket. However, if the code is not correct in the foregoing, the program proceeds to the block 430 via line 440. In block 430 the code which is to be tested at a later stage is written in a number of storage locations yet to be specified in the read/write memory of the microprocessor TMS 1000. The risk of this code being "accidentally" formed can be made negligibly small by choosing a sufficiently large code. After the generating of the code in the block 430, the program proceeds to the preparation routine. Once the code has been formed, therefore, each time the loop 434/438 is traversed, be it with changing routines from the set of operative routines.

When the device is put into operation by insertion of the power plug, the programming may be set to an arbitrary position of its address counter for the program (read-only) memory. As a result of the described composition of the control program, any memory address occurring therein leads to the fast entering (via block 436) of the preparation routine. It may be that there are still unused locations in the program memory. Various solutions are possible in this respect. The simplest solution consists in that all these program locations contain a dummy code: the address counter must then interrogate all addresses until the first non-dummy instruction is encountered; this is preferably the first instruction of the block 430: the formation of the code in the volatile section of the memory. In given circumstances, the addressing of these addresses may require a substantial amount of time. It is alternatively possible for the program memory to be subdivided into pages, so that the address counter would continuously address the memory locations of one and the same page; in the case of a completely empty page, a deadlock would then occur. Therefore, the content of a number of unused memory locations (at least one per completely empty page) or even all unused memory locations in the program memory preferably directly indicates the first address of the block 430, which is symbolized by the Figure (block 428 which indicates the unused memory locations). The unused memory locations can in principle indicate any other address of the blocks 430, 432, 434, 436, but this indirect indication of the beginning of the block 430 is less fast.

Figure 4:
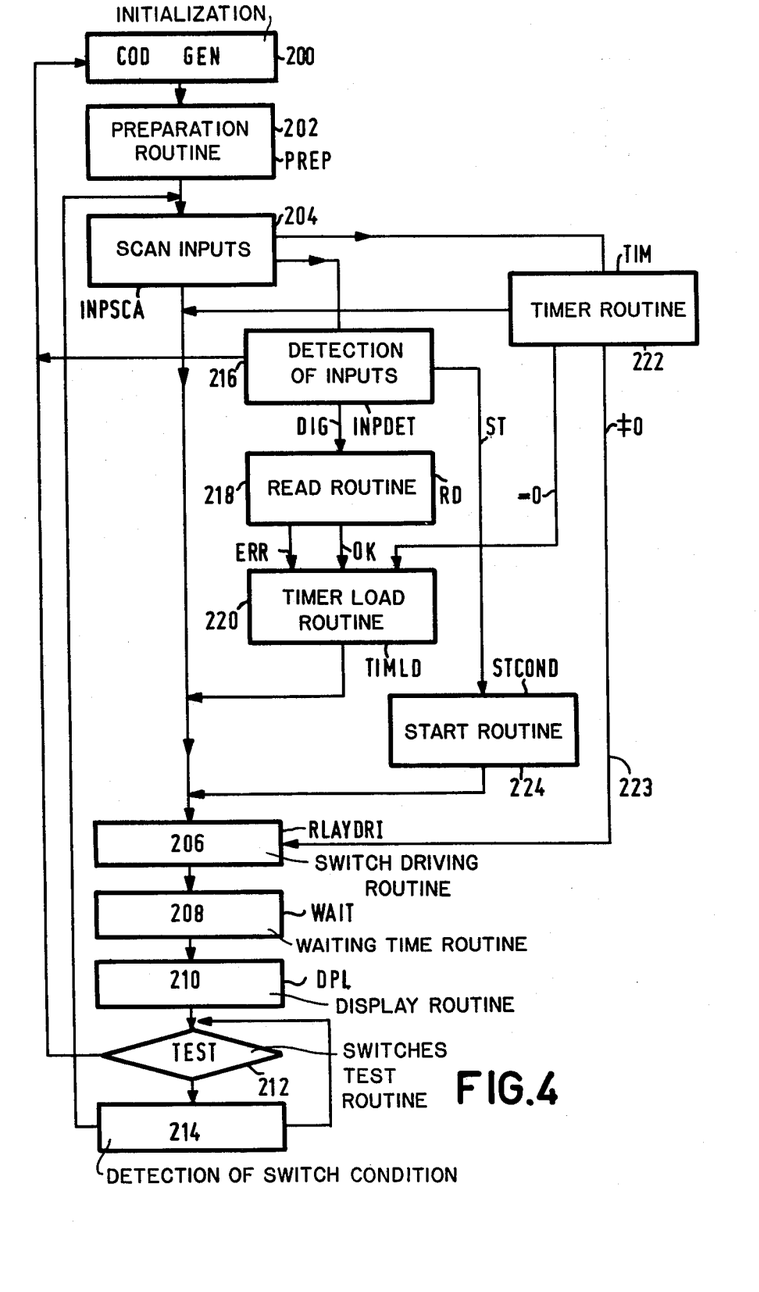
FIG. 4 is a general survey of the coherence of the subroutine underlying the operation of the device shown in FIG. 2.

FIG. 4 diagrammatically shows the coherence of the subroutines of the flow chart underlying the operation of the device shown in FIG. 2; the diagram will be elaborated at a later stage with reference to the FIGS. 5 to 8. The flow chart starts with the block 200: therein a code is generated which consists of 16 words of four bits each and which is stored in the read/write memory of the micrprocessor TMS 1000. The first address of the block 200 is indicated by all addresses symbolized in FIG. 3, block 428. From block 200 block 202 is reached; this acts as a preparation for the actual program: the operative routines. Thus, the blocks 200 and 202 together correspond to block 430 in FIG. 3. Therefrom a path extends to 204: the routine of the sampling of the input signals. Therefrom, paths extend to 206: relay energizing routine; to 216: routine of detecting the input data; and to 222: the routine of the time indicator (or updating device). From 206 a path extends to 208: waiting time routine. From 208 a path extends to 210: display routine. From 210 a path extends to 212: routine of the testing of the code (only one word of the 16 code words is tested). Thus, therefrom a path extends to the block 200. From the block 212 a path extends to the block 214: the detection of the condition of the switches. From the block 214 a first path extends back to the block 212: switches unsafe, so the loop 212-214 serves as a termination loop. From block 214 a second path extends back to 204 (see above). From 216 a path extends to 218: write routine, and a path to 224: routine of the start condition. From 218 a path extends to 220: loading routine for the time indicator. From 220 a path extends to 206. From 222 a path extends to 206, to 220, and a second path to 206 (223). From 224 a path extends to 206. The procedure will be described in detail with reference to the FIGS. 5, 6, 7.

Figure 8:
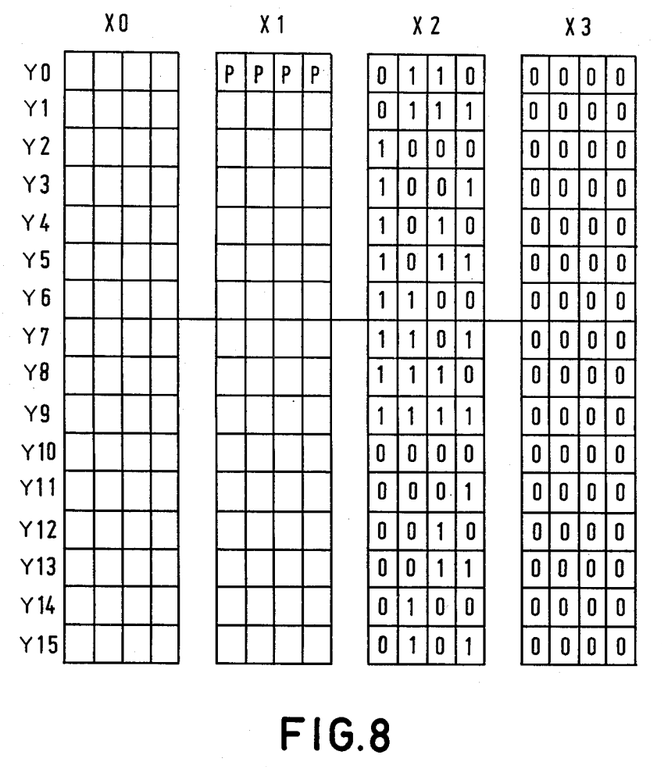
FIG. 8 illustrates the content of a part of the volatile memory of the programming device.

FIG. 8 illustrates the content of the read/write memory section of the microprocessor 56 of FIG. 1. The capacity is four banks of 16 four-bit words each. The bank addresses are supplied by the so-called X-register and the word addresses by the so-called Y-register. The words Y6-Y11 of the bank 0 contain the time yet to be completed, i.e. successively: the number of tens of minutes, the number of further minutes, the number of tens of seconds, the number of further seconds, the number of 1/5 seconds, and finally the number of further 1/50 seconds. The word Y9 is the start word and contains the start bit (for the time indicator), 0,0, and the enable bit for starting. The word Y10 successively contains x (don't care bit), the "first time" bit, the "50 Hz block" bit, and x. Word Y11 successively contains the "saving" bit for the time updating device, x, x, the "waiting time expired" bit, and the display blanking bit. Word Y12 contains the sampling bit for the output information, x, x, x. Word Y13 contains three bits which act as a counter against the jittering of key contacts, and the input blocking bit. Word Y0 contains the information of the last R output signal during the sampling of the input information. In bank X1, the words Y5, Y6 contain time setting information in minutes and tens of minutes, respectively, like the words Y5, Y6 in bank X0. word Y0 contains pointer information PPPP for testing one code word at the time which is stored in the bank X3. Bank X2 contains 16 code words for testing whether the preparation routine has been correctly executed. Word Y0 contains the information "6", word Y1 the information "7", and so on; notably the word content is not equal to the word address. In this embodiment, bank X3 is not used.

Figure 5:
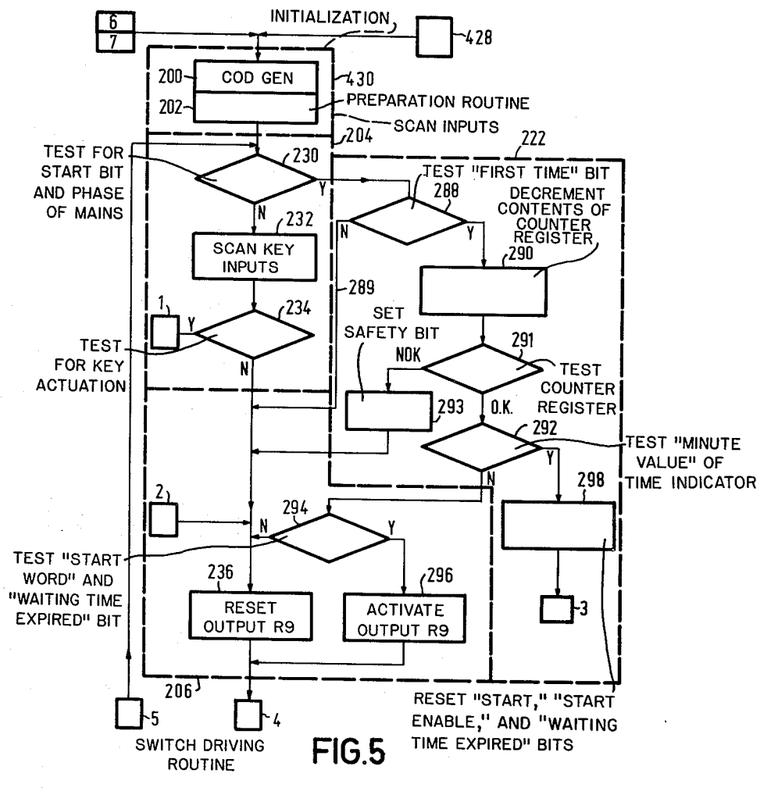
FIG. 5 shows first subroutine details of FIG. 4, sampling input signals, detecting input data and energizing relay.
Figure 6:
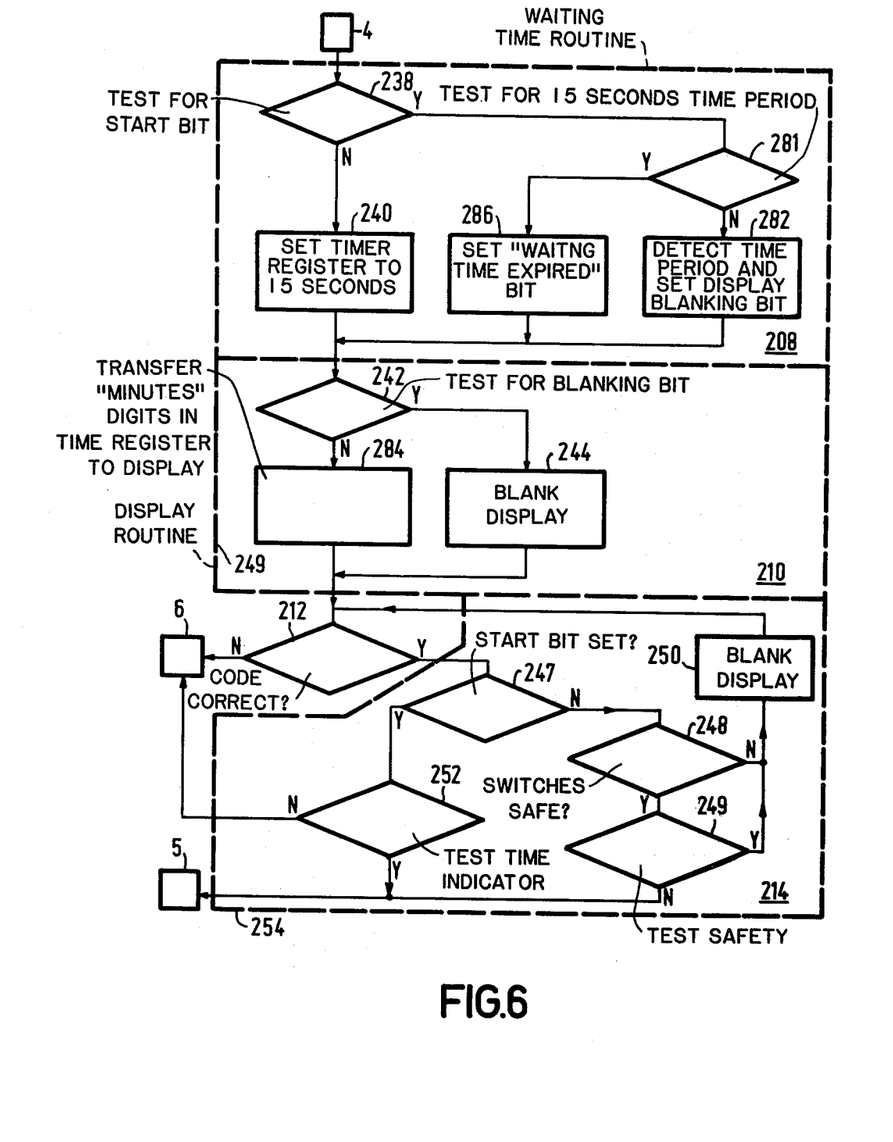
FIG. 6 shows second subroutine details of FIG. 4, waiting time, testing code and detection of switch conditions.

FIG. 5 shows a first part of a detail of the diagram of FIG. 4. When the voltage between Vdd and Vss has become sufficiently high, the internal clock is started. For correct execution of the program a jump to the preparation routine in block 202 is required. There are two ways of making this jump:

(1) the first instruction executed does not belong to the actual program, all these instructions (428) control an address jump to the first address of the subroutine 200;

(2) the first instruction executed does belong to the actual program: when block 212 is passed (FIG. 4), it is tested whether the preparation routine has already been executed. If the result of the test is negative, the program proceeds (input "6") to the first address of block 200, so that the 64-bit code for the memory bank X2 is generated (FIG. 8). It is this code from which one word is tested in the described test. Subsequently, the following non-conditional operations are executed in the block 202:

1. the registers of the microprocessor are reset.
2. the time indication (present in the minutes section of the updating device, see hereinafter) is then "00", but on the display device this information is displayed as two strokes on the central horizontal segments; thus, "nothing" is displayed. This is realized in that the blanking bit for the display device (word Y11) is made equal to "1"; the actual 4-bit code for the display elements is then "1111". Via the output device (PLA) of the microprocessor 56, this is translated into the 8-bit code 0100-0000.

Block 202 has a single output to block 204: the routine of the sampling of the input signals. In block 230 it is tested whether the start bit (word Y9) of the timer has been set and the positive phase of the 50 Hz power voltage is present. Initially, these two conditions (to be combined by an AND-function will not both be satisfied (notably the start bit is 0). In block 232, the key inputs of the key board 84 of FIG. 2 are sampled by interrogation of the outputs R0-R4 of the microprocessor. The information received is stored in the accumulator register of the microprocessor 56. In block 234, it is detected whether a key is depressed, i.e. whether the content of the accumulator register does not equal zero. Initially, no key will be depressed (result of the test: negative). In that case the program proceeds to the block 206: the relay energizing routine. In block 236, the output R9 of the microprocessor 56 is made logic "0". Initially, this will be a dummy operation, because this information already has the value "0". Subsequently, the program proceeds to the block 208 in FIG. 6: the waiting time routine; the waiting time is the time which expires between the operation of the start key and the actual switching on of the irradiation source. In block 238 it is tested whether the start bit has been set (see also block 230). Initially, this will not be the case. In block 240, the seconds section (word Y3) of the register of the time indicator is filled with the information: 15 seconds. This is the value (1111) of the waiting time. Moreover, a further section (word Y4) of the register of the time indicator is filled with the information: 60 seconds (0110); thus, the irradiation time adjusted in the register becomes one minute too long. This offers the advantage that the position 0 minutes, 60 seconds can be used for the detection of the end of the irradiation time. Subsequently, the program proceeds to the block 210: the display routine. In block 242 it is first tested whether the blanking bit for the display device has been set to "1". This bit controls the flashing of the display during the waiting time. Initially, this bit Y5 (in the word Y11) will not have been set to "1". In block 284, the information of the minutes register of the time indicator is applied to the display device in two operations via a multiplex organization. Initially, this will result (see block 202 above) in the display of the central two horizontal elements of the display device. Multiplexing is controlled by the first bit of the word Y12. If the blanking bit has the value "1" (this is so every other second during waiting), the display is blanked in block 244. The afterglow time of the display elements is much shorter than 1 second, so that the display "flashes". Subsequently, the program changes over to the block 212: therein, it is tested whether one of the words of the sixteen-word code in the memory bank X2 has the correct value. The selection of the relevant word is performed by the pointer (word Y0, bank X1), the content of which is increased by 1 for the test. If the code word is not correct, an address jump is made to block 200 in FIG. 5 via output 6. If the code word is correct, it is tested in block 247 whether the starting bit has been set (see block 238). If the start bit has not been set to "1" (which will initially be the case), it is tested in block 248 whether the switches are "safe" (via output R10 and input K1), that is to say whether they are both in the open condition (the chance that both switches are closed is neglected). Normally, the switches will be safe and the program will proceed to block 249. If they are not safe, however, the display will be blanked in block 250. This is realized by the four-bit code "1110"; under the control thereof, the programmed logic arrangement generates the information 0000—0000 on its output. Via the blocks 212, 247, 248 and 250, a persistent loop is then formed. This loop is traversed for as long as the fault in the switches persists. If the switches are safe (247), the safety bit is tested in block 249. This bit is logic "1" if the registers of the time indication do not indicate correctly. In an unsafe condition, a loop is formed via the blocks 212, 247, 248, 249 and 250. The loop thus described (the blocks 204, 206, 210, 212) can be traversed an arbitrary number of times and thus constitutes an initial waiting loop. When a key is depressed, the program proceeds from block 234 to block 216 (FIG. 7): the detection routine for the input information. In block 254 it is detected which key has been depressed and the fourth bit of word Y13 (bank X0) is made equal to "0". If the same key is detected again during the traversing of the loop, the sum of the first three bits of the word Y13 is incremented by one unit. If an overflow condition arises, a "real" key which may be processed is concerned. If no key or another key is detected during the traversing of the loop, Y13 is reset to zero. Thus, bouncing of the keys does not have an adverse effect. When the key signal has been processed, the fourth bit of the word is set to "1" in order to block repeated processing. In block 255 it is detected whether the correction key (CORR) is concerned. If this is so, the program returns to the block 200. The correction key thus implicitly acts as a "reset" key, also for the entire program. Otherwise, it is subsequently tested in block 256 whether the start key (ST) has been operated. If this is not so, the digit key is decoded in block 258 and the program proceeds to block 218: the write routine. First the digit keyed-in in block 260 is then stored in the memory bank X1, word Y5. The first key is the most significant key. In block 262 it is tested whether the key is permissible. The first key is always permissible, the 0 again produces the display "nothing". Furthermore, in block 260 the repeat bit (second bit in word Y10) is set to the position "repeat possible", i.e. "0". When a key having a permissible digit value has been operated, the enable bit for starting is subsequently made equal to "1" in block 264. Subsequently, the program proceeds to block 220: load routine for the time indicator. In block 266 exclusively the keyed-in digit is stored in the register (minutes section) of the time indicator: bank X0, word Y5 of the memory. Subsequently, the program proceeds to block 206 in FIG. 5. The described excursion to FIG. 7 takes place only once for each keying operation. For as long as the key is not released and a further key (may be the same key) is depressed again, said main loop formed by the blocks 204–206–208–210–212 is subsequently traversed. The key first depressed is then displayed in the least-significant position. When a second digit key is depressed, the same takes place as when the first key was depressed: the second digit becomes the least significant digit, while the digit first depressed is transferred to the most-significant position (word location Y6) and is displayed accordingly. In block 262 a test for correct operation is performed: the operation is correct if at the most two digit keys are successively depressed (one key, however, is already sufficient). If the adjusted irradiation time exceeds 40 minutes, the enable bit for starting is reset to zero in block 268 and the information "nothing" is again displayed by way of two horizontal strokes (the latter in block 270); from block 270, the program proceeds to block 266 again and subsequently to block 206 in FIG. 5.

Figure 7:
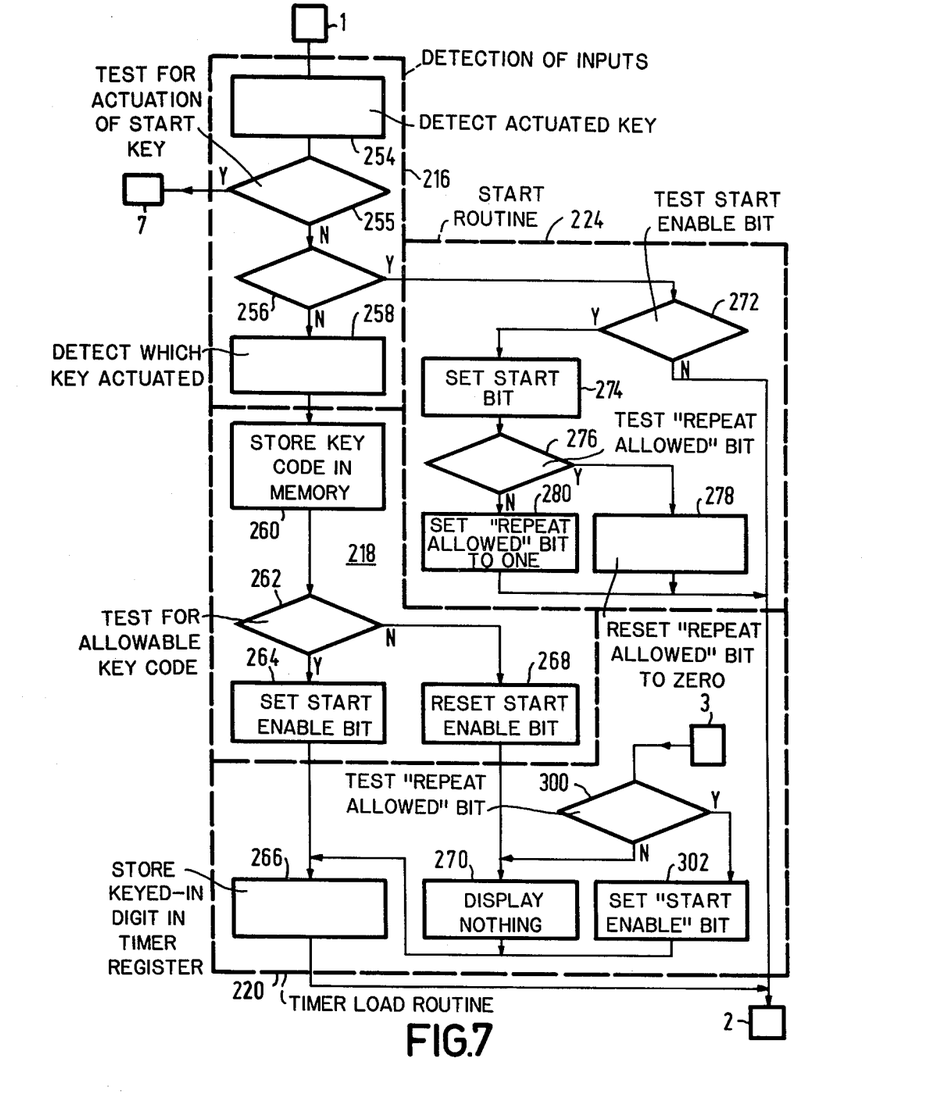
FIG. 7 shows third subroutine details of FIG. 4, write routine, start conditions and timing.

The time already keyed-in can be reset to zero by operation of the correction key. In FIG. 7 the program then proceeds from block 255 to block 202 in the preparation routine: all registers are reset to their starting position. If no correction is necessary, the start key may be depressed in second or third instance. In FIG. 7 the program then proceeds from block 216 to block 224: the routine of the starting condition. First it is tested in block 272 whether the enable bit for starting has the value "1". This bit has been set to "1" in block 264. However, if it has not been set to "1", the program returns to block 206 in FIG. 5. If the enable bit has been set to "1", the start bit is set to "1" in block 274. In block 276 it is tested whether the bit "repeat possible" (second bit of word location Y10) has the value "0" or "1". This bit has been set to zero in block 260. If the first time is concerned, this bit is now set to "1" in order to indicate that repetition is possible (block 278). If it was "1", however, it is reset in block 280: repetition is no longer possible. The output of the blocks 278 and 280 is linked to block 206 in FIG. 4. Via this bit "repeat possible", two equally long irradiations can be successively activated without the time programming having to be adjusted again for the second time. When the device is switched on, and when the adjusted time is changed, this bit is always set to zero (in block 260). Said repeat can thus be omitted. The start bit has thus been set. As has already been stated, it can be tested in the blocks 230, 238 and 246 in the FIGS. 5, 6. First a branch connection can be made from the block 238 to the block 281. Therein, it is tested whether the time of 15 seconds generated in block 240 has already expired (this time is counted down in block 222). If the start bit has not yet been set to "1", this time is set again upon each passage through the block 240. If said 15 seconds have not yet expired, the program proceeds from block 281 to block 282. Therein, it is detected whether the time value in seconds (in word Y3) is even or odd. If the time is even, the display blanking bit is set to "1"; if the time is odd, this bit is set to "0". Subsequently, the program proceeds to block 210; the display routine; the display blanking bit in block 210 is either "0" or 371", so that either the block 244 is reached (in which case the display is blanked), or the block 284 is reached. In the block 284, the digits in the minutes section of the register of the time indicator are applied to the display device. The display thus flashes for 15 seconds. After expiration of the 15 seconds (test in block 281), the bit "waiting time expired" is set in block 286. For the remainder, the loop closed via the output "5" is continuously traversed. The safe condition of the switches (block 248) is then no longer tested, but the updating register for the time indication is tested for safety reasons in block 252. If the content indicates more than 40 minutes, all registers are reset to the starting position in the preparation routine. As a result of the multiplexing in block 284, two loops must be traversed for the display of the complete number. The said counting down takes place in block 222. Furthermore, in block 230 the start bit for the time indicator is "1" and the chance that the supply voltage 50 Hz is also in the positive phase is 50%. If it is in the positive phase, the program proceeds from block 230 to block 288. Therein, it is detected whether the "first time bit" (third bit of word Y10) has the value "0". If it has the value "0", the program proceeds to block 290. In block 290 the content of the counter register (word locations Y0-Y6) are counted down by 1/50 seconds. Moreover, in block 290 said "first time bit" is reset to "1". The setting (to "0") of this first time bit takes place in block 232. In block 291 it is detected whether the counter registers function properly. This is realized as follows: first the counter position is retrieved from the memory, after which it is applied to the accumulator of the microprocessor and is decremented by 1 (i.e. by 1/50 second). Subsequently, this position is stored again in the memory. Finally, it is tested whether the sum in the accumulator equals the sum newly stored in the memory. If this is not the case, the program proceeds to block 293 in which the safety bit is set. As has already been stated, the testing thereof takes place in block 284. The updating is thus tested. If the test is "true", it is tested in block 292 whether the minutes value of the time indicator is "0". If this is not the case, the program proceeds to block 294. In block 294 the following conditions are tested:

(a) does the start word (word Y9) have the correct value (i.e. "1001")

(b) does the bit "waiting time expired" have the value "1" (set in block 286).

If the test is "false", the program proceeds to block 236: output R9 and hence the switches 24, 26 are no longer activated by said 1 kHz pulse series. If they were activated until then, the activation is terminated. If the test in block 294 is "true", the program proceeds to block 296: the output R9 is activated and the irradiation commences. When the time indicator indicates the value "0 minutes" in block 292, the irradiation time has expired (because 60 seconds were previously added). The program then proceeds to block 298; therein, the start bit for the time indicator; the enable bit for starting; and the bit "waiting time expired" are set to "0" and the irradiation has been completed: the output R9 is no longer activated after the next passage through the block 206. Subsequently, the program proceeds to block 220 in FIG. 7: loading routine for the time indicator. First it is tested in block 300 whether the bit "repeat possible" has the value "true". If this is so, the enable bit of the start is set again in block 302. Subsequently, the program proceeds to block 266. If said enable bit has the value "false", the time setting is set to zero in block 270 with the display blanking as at the exit of the block 202. In block 266, the minutes section of the register (values Y5, Y6 in bank X1) is set to zero. The initial condition has thus been restored. The word Y0 of bank X0 serves as a counter register for indicating which one of the R outputs has been activated last for the sampling of the keyboard.

In the described embodiment, the program comprises only one subroutine in which the multi-bit code is tested. The program can be executed in many loops which all have the subroutine in common. It is alternatively possible, if the loops do not coincide at all, to implement such a test routine at different locations, possibly using the same "multi-bit code".

What is claimed is:

1. A stand-alone appliance for general consumer use, comprising:
   (a) a connection (402) which comprises a detachable contact member (404) for connecting an electrical power supply source to a distribution member (408) for deriving a first and a second supply current from said power supply source;
   (b) a control circuit (422) which comprises a first input (420) for receiving the first supply current, a second input (424) for receiving a specific control signal, and a first output (425) for a controlled activation signal;
   (c) a functional member (426) which comprises a second input for receiving said activation signal;
   (d) a digital programming device (412) which comprises a non-volatile memory section which contains a control program for said functional member in first memory locations, and which also comprises a volatile (X0-X3) memory section for variable data, a third input (410) for receiving the second supply current, directly from said distribution member, a fourth input for a specification signal to said functional member, and a second output for said specific control signal;
   (e) externally activatable means for forming said specification signal (414,416,418); characterized in that said digital programming device comprises:
   (f) first means for implementing an operative routine (434) for generating said specific control signal, each persistent loop thereof comprising a subroutine (436) which tests a dummy multibit code which is stored in a predetermined location of said volatile memory section;
   (g) second means for implementing a preparation routine prior to beginning the operative routine, and which first unconditionally generates said multibit code (430) and subsequently a starting condition (432) for the operative routine, the beginning of the preparation routine being indicated by the programming device under the control of a negative result of said test.

2. An appliance as claimed in claim 1, characterized in that said operative routine comprises only one persistent loop in which said subroutine is contained.

3. An appliance as claimed in claim 1 or 2, characterized in that said multi-bit code contains a series of multibit elements, there being provided a pointer (X1, 0) for indicating, upon passage of said subroutine, exlusively one next multi-bit element of said series for testing.

4. An appliance as claimed in claim 1 or 2, characterized in that a number of further memory locations of said non-volatile section also contain pointer information for the beginning of the preparation routine.

5. An appliance as claimed in claim 4, characterized in that each separately addressable location of said non-volatile section contains either a word of said program or pointer information (428) for the beginning of the preparation routine.

* * * * *